(12) United States Patent
Peck et al.

(10) Patent No.: US 12,397,911 B2
(45) Date of Patent: Aug. 26, 2025

(54) FLYING VEHICLE ROTOR ARRANGEMENT

(71) Applicant: VERTICAL AEROSPACE GROUP LIMITED, London (GB)

(72) Inventors: James Peck, London (GB); Keith Walker, London (GB); Guillaume Francois, London (GB); William Delany, London (GB); Brett Peterson, London (GB)

(73) Assignee: VERTICAL AEROSPACE GROUP LIMITED, London (GB)

( * ) Notice: Subject to any disclaimer, the term of this patent is extended or adjusted under 35 U.S.C. 154(b) by 0 days.

(21) Appl. No.: 18/019,962

(22) PCT Filed: Aug. 4, 2021

(86) PCT No.: PCT/GB2021/052021
§ 371 (c)(1),
(2) Date: Feb. 6, 2023

(87) PCT Pub. No.: WO2022/029435
PCT Pub. Date: Feb. 10, 2022

(65) Prior Publication Data
US 2023/0286650 A1 Sep. 14, 2023

(30) Foreign Application Priority Data
Aug. 6, 2020 (GB) ...................................... 2012264

(51) Int. Cl.
*B64C 29/00* (2006.01)
*B64C 27/28* (2006.01)
*B64C 27/32* (2006.01)

(52) U.S. Cl.
CPC .......... *B64C 29/0033* (2013.01); *B64C 27/28* (2013.01); *B64C 27/32* (2013.01)

(58) Field of Classification Search
CPC ..... B64C 29/0033; B64C 27/28; B64C 27/32; B64C 11/48; B64C 27/26; B64U 10/20;
(Continued)

(56) References Cited

U.S. PATENT DOCUMENTS 9,284,962 B2 3/2016 Long et al.
9,944,386 B1 * 4/2018 Reichert ................. B64C 27/20
(Continued)

FOREIGN PATENT DOCUMENTS

CN 109969392 A1 7/2019
DE 102020211638 A1 7/2021
(Continued)

OTHER PUBLICATIONS

Aug. 2, 2022 International Search Report issued in International Patent Application No. PCT/GB2022/051307.
(Continued)

*Primary Examiner* — Joshua D Huson
*Assistant Examiner* — Vicente Rodriguez
(74) *Attorney, Agent, or Firm* — EIP US LLP

(57) ABSTRACT

A flying vehicle includes a first rotor assembly, a second rotor assembly and a second rotor assembly pylon arranged to mount the second rotor assembly to the remainder of the flying vehicle. The first rotor assembly and the second rotor assembly are located so that they are spaced in a longitudinal direction of the flying vehicle and so they are substantially on a vertical plane that is parallel to a vertical plane aligned with a longitudinal axis of the flying vehicle. The first rotor assembly includes a tilt-rotor arranged to tilt between delivery of substantially vertical flight thrust and substantially conventional flight thrust. The second rotor assembly includes a stacked plurality of substantially vertical thrust rotors mounted to the pylon so as to be substantially to the same side of the pylon.

18 Claims, 3 Drawing Sheets

(58) Field of Classification Search
CPC ........ B64U 10/14; B64U 10/25; B64U 50/13; B64U 30/293; B64U 50/14; B64U 30/297; B64U 30/10
See application file for complete search history.

(56) References Cited

U.S. PATENT DOCUMENTS

| | | | |
|---|---|---|---|
| 10,189,565 B2* | 1/2019 | Patterson | B64C 37/02 |
| 10,494,088 B1* | 12/2019 | Coralic | B64C 27/10 |
| 11,254,425 B2 | 2/2022 | Thalheimer et al. | |
| 11,312,486 B2* | 4/2022 | Regev | B64U 50/20 |
| 2015/0132104 A1 | 5/2015 | Long et al. | |
| 2015/0136897 A1* | 5/2015 | Seibel | B64C 29/0033 244/6 |
| 2015/0367935 A1 | 12/2015 | Long | |
| 2019/0016459 A1 | 1/2019 | North et al. | |
| 2019/0092461 A1* | 3/2019 | Duffy | B64C 11/28 |
| 2019/0100313 A1* | 4/2019 | Campbell | B64D 1/02 |
| 2019/0135424 A1* | 5/2019 | Baity | B64C 39/10 |
| 2019/0176980 A1 | 6/2019 | Brand et al. | |
| 2019/0337614 A1 | 11/2019 | Villa et al. | |
| 2020/0172236 A1 | 6/2020 | George | |
| 2021/0253231 A1 | 8/2021 | Ensslin | |

FOREIGN PATENT DOCUMENTS

| | | |
|---|---|---|
| EP | 3459843 A1 | 3/2019 |
| EP | 3495260 A1 | 6/2019 |
| JP | 2010254264 A | 11/2010 |
| RU | 2702868 C1 | 10/2019 |
| WO | 2019/109621 A1 | 6/2019 |
| WO | 2021/010915 A1 | 1/2021 |
| WO | 2021/155208 A1 | 8/2021 |

OTHER PUBLICATIONS

Aug. 2, 2022 Written Opinion issued in International Patent Application No. PCT/GB2022/051307.
Dec. 6, 2021 Search Report issued in British Patent Application No. 2108205.2.
U.S. Appl. No. 18/569,053, filed Dec. 11, 2023 in the name of Mark Cornborough et al.
Nov. 8, 2021 International Search Report issued in International Patent Application No. PCT/GB2021/052021.
Nov. 8, 2021 Written Opinion issued in International Patent Application No. PCT/GB2021/052021.
Jan. 19, 2021 Search Report issued in British Patent Application No. 2012264.4.

* cited by examiner

FLYING VEHICLE ROTOR ARRANGEMENT

TECHNICAL FIELD

The present disclosure relates to a flying vehicle rotor arrangement. An aspect relates to a flying vehicle. Embodiments may have particular application in aircraft with distributed propulsion systems such as Vertical Take Off and Landing (VTOL) capable aerial taxis, though this is not intended to be limiting.

BACKGROUND

For the purposes of illustration the following background will be described in the context of VTOL aerial taxis. This is not however intended to be limiting.

Recent technology developments have enabled a new class of aircraft to be developed. These aircraft are capable of high cruise speeds, VTOL using a distributed electric propulsion system. A distributed electric propulsion system may allow high levels of safety via redundancy, low operating costs, and low noise signatures.

Nonetheless, challenges remain in terms of selecting the airframe and propulsion system architecture. The principle challenge is to configure the aircraft to be capable of efficient VTOL flight and efficient cruise at high speed whilst retaining adequate redundancy of all systems.

SUMMARY OF THE INVENTION

According to a first aspect there is provided a flying vehicle comprising optionally a first rotor assembly, optionally a second rotor assembly and optionally a second rotor assembly pylon optionally arranged to mount the second rotor assembly to the remainder of the flying vehicle, where the first rotor assembly and the second rotor assembly are optionally located so that they are spaced in a longitudinal direction of the flying vehicle and optionally so they are substantially on a vertical plane that is parallel to a vertical plane aligned with a longitudinal axis of the flying vehicle, and where the first rotor assembly optionally comprises a tilt-rotor optionally arranged to tilt between delivery of substantially vertical flight thrust and substantially conventional flight thrust, and where further the second rotor assembly optionally comprises a stacked plurality of substantially vertical thrust rotors optionally mounted to the pylon so as to be substantially to the same side of the pylon.

The alignment of the first rotor assembly and the second rotor assembly such that they are spaced in a longitudinal direction of the flying vehicle and so they are substantially on a vertical plane that is parallel to a vertical plane aligned with a longitudinal axis of the flying vehicle, may be such that there is an axis, parallel to the longitudinal axis of the flying vehicle, along which a projection of one or other of the first and second rotor assemblies towards the other, would at least partially overlap that other. Relevant degrees of alignment may be those sufficient for potential non-negligible wash interception by a downstream of the first and second rotor assemblies generated by an upstream of the first and second rotor assemblies.

The use of a tilt-rotor may facilitate improved efficiency in cruise/conventional flight whilst still allowing the rotor to make a vertical thrust contribution during vertical and transition flight configurations. The use of the stacked plurality of substantially vertical thrust rotors provides the facility for additional vertical thrust without the need for provision of a tilt-rotor, which might be heavier. Thus the combination of the tilt-rotor and stack may provide enhanced performance and/or additional flight configuration options. Spacing the first and second rotor assemblies in the longitudinal direction and optionally in the vertical direction, but being positioned with substantially common lateral axis displacements, may be desirable or advantageous for various reasons (e.g. dynamic considerations, weight distribution, packaging, complexity reductions, component and/or system sharing etc). Nonetheless, it may make it more likely that one of the first and second rotors experiences the wash of the other during at least some flight configurations.

The provision of the stacked rotor blades on one side of the pylon (e.g. without the pylon separating them) may mean that separation between the rotors of the stack can be reduced (even to substantially no separation). This may reduce the likelihood of blade vortex interaction between the rotors and therefore improve efficiency and noise performance. Closer proximity may also allow for the possibility of the stack being adjustable between stowed (when not in use e.g. during conventional flight) and deployed (when vertical thrust from them is required) configurations. In the stowed configuration the blades of each rotor in the stack may be aligned with a corresponding blade(s) in the other rotor(s) of the stack and the rotors are rotationally oriented to present a substantially minimum total frontal cross-section in order to reduce the drag they cause. Impacts such as these may be all the more significant where the stacked rotors are (at least in some flight configurations) impinged upon/ingest at least part of the wake of another rotor (e.g. the tilt-rotor). Alternatively however, the potential for greater proximity between the stacked rotors may allow for a smaller overall package of stacked rotors and this may facilitate positioning to largely or completely avoid the wake of the tilt-rotor despite its continued presence with the potential advantages that brings. The potential for greater proximity between the stacked rotors may also allow for the separation to be such that the stacked rotors behave as a single multi-element lifting aerofoil, with potential efficiency, dynamic and noise benefits. The potential for greater proximity may also allow for the sharing of components in (for example) supporting and servicing the stacked rotors, which may reduce complexity and/or weight.

In some embodiments the first rotor assembly and the second rotor assembly are located in a manner so that both are substantially on an axis that is parallel to a longitudinal axis of the flying vehicle. Thus, it may be for instance that centre lines and/or axes of rotation of the first and second rotor assemblies fall on an axis substantially parallel to the flying vehicle centreline axis. Locating one of the first rotor assembly and the second rotor assembly substantially directly downstream of the other (in conventional flight) may be desirable for various reasons (e.g. dynamic considerations, weight distribution, packaging, complexity reductions, component and/or system sharing etc). Further, by positioning the stacked rotors on one side of their supporting pylon, potential disadvantages associated with this arrangement (e.g. wash effects) may be at least partially mitigated (as discussed above).

In some embodiments a separation between the vertical thrust rotors of the second rotor assembly is less than substantially 100% of a mean aerodynamic blade chord length of blades of the vertical thrust rotors. In other embodiments the separation between the vertical thrust rotors of the second rotor assembly is less than substantially 80%, 60%, 40%, 30% or 20% of a mean aerodynamic blade chord length of blades of the vertical thrust rotors. Proximities such as these may accentuate at least some of the potential benefits of the invention discussed above, with ever decreasing separations providing ever enhancing benefits. Nonetheless a degree of trade-off may occur in that blade hub design freedom may be limited as ever decreasing separations are used.

In some embodiments there are no static structures located in an anulus defined between blade planes of at least one pair of the stacked plurality of substantially vertical thrust rotors. By avoiding the provision of static structures (e.g. a pylon or nacelle) between the rotating blades, the stacked rotors may be provisioned closer together and flow interference (and thereby disruption of cooperative aerodynamic effects among the stacked rotors) may be avoided.

In some embodiments the first rotor assembly is located further forward on an airframe of the flying vehicle than the second rotor assembly. This arrangement may be desirable for various reasons including that during transition, more vertical thrust may be required from more rearward rotors than more forward rotors. This is because during transition there is a natural tendency towards the flying vehicle adopting a nose-up attitude which can be countered via increased vertical thrust towards the rear of the flying vehicle by comparison with that generated towards the front of the flying vehicle. With the second rotor assembly being a dedicated vertical thrust assembly (e.g. fixed for vertical thrust or allowing only limited rotor pitch adjustments e.g. for stability) may mean it is better suited to providing increased vertical thrust during transition by comparison with a tilt-rotor potentially undergoing angular adjustment, and therefore may be advantageously located more rearward with respect to the flying vehicle. In arrangements where the first rotor assembly is located further forward on an airframe of the flying vehicle than the second rotor assembly, the significance of potential drag reduction at the second rotor assembly facilitated by the lack of an intervening pylon may be more significant. This is because downstream of the tilt-rotor, the second rotor assembly may experience accelerated air-flow caused by its wake. Improvements in efficiency, dynamic and/or noise performance (e.g. as may be facilitated by the stacked rotors behaving as a single multi-element lifting aerofoil) may also be more significant for the same reason. Alternatively, the facilitation of tighter overall packaging of the second rotor assembly, may allow an arrangement such that the second rotor assembly avoids to a greater extent the wake of the tilt-rotor.

In some embodiments the first rotor assembly is arranged such that within a full range of tilt angles of its tilt-rotor there is a tilt angle in which an axis between the centre of the tilt-rotor and a centre point of the stacked rotors of the second rotor assembly is substantially normal to a plane of rotation defined by the blades of the tilt-rotor rotating for thrust delivery. Where the tilt-rotor has a plane of rotation, defined by the blades of the tilt-rotor rotating for thrust delivery, substantially facing the stacked rotors, it may be more likely that the stacked rotors experience the wake of the tilt-rotor. This may for instance occur during conventional flight and/or transition flight configurations.

In some embodiments the first rotor assembly is arranged such that within a full range of tilt angles of its tilt-rotor there is no tilt angle in which an axis between the centre of the tilt-rotor and a centre point of the stacked rotors of the second rotor assembly is substantially normal to a plane of rotation defined by the blades of the tilt-rotor rotating for thrust delivery. Where the tilt-rotor does not have a plane of rotation, defined by the blades of the tilt-rotor rotating for thrust delivery, substantially facing the stacked rotors, it may be less likely that the stacked rotors experience the wake of the tilt-rotor. This may be facilitated by the invention and may prevent/mitigate wash effects that would otherwise occur.

In some embodiments the stacked vertical thrust rotors are mounted to the pylon so as to be substantially above the pylon. Increased elevation of the stacked rotors e.g. as may be facilitated by positioning them above the pylon, may tend to decrease the extent of impingement of the wake of any upstream tilt-rotor, with exhaust directions varying between substantially rearward and substantially downward, impinging on the stacked rotors. Thus negative consequences of such impingement (e.g. increased noise and higher blade loads at the stacked rotors) may be at least partially mitigated.

In some embodiments the second rotor assembly is located further forward on an airframe of the flying vehicle than the first rotor assembly. A number of the benefits discussed above (e.g. performance benefits of the first and second rotor assemblies as a paired unit) will persist even where the stacked rotors are further forward than the tilt-rotor. Further, whilst the advantages relating to the wake of the tilt-rotor may not apply or be less relevant, additional benefits may arise. For instance, this arrangement may facilitate reduced exposure time and/or probability for intersecting blade release trajectories and rotor cascade failures. Additionally, the arrangement may help to balance or mitigate a propeller fin effect which may be generated by one or more other rotors e.g. an additional instance or instances of the paired rotor arrangement of the first aspect but with the first rotor assembly located further forward on the airframe of the flying vehicle than the second rotor assembly. Propeller fin effect is the resulting yawing or pitching moment produced by a propeller normal force. A propeller normal force is generated whenever a propeller is inclined to the flow whereupon it acts like a lifting surface and may therefore be more prevalent where tilt-rotors are used.

In some embodiments the second rotor assembly is arranged to provide thrust during at least a portion of a transition flight configuration of the flying vehicle during which the tilt-rotor of the first rotor assembly is tilting between delivery of substantially vertical flight thrust and substantially conventional flight thrust.

In some embodiments the stacked plurality of vertical thrust rotors are arranged in at least some configurations to act as a single lifting aerofoil. Thus it may be for instance that the stacked rotors work in a coupled manner to thereby increase lift and/or delay stall. The orientations of the blades within the different stacked vertical thrust rotors and the proximity of the stacked rotors may be such that amongst a pair of the stacked rotors the wash from an upstream of the pair energises the flow at a downstream of the pair. This may be facilitated at least in part by the provision of the stacked plurality of vertical thrust rotors to one side of the second rotor assembly pylon, rather for instance than being separated thereby.

In some embodiments the stacked plurality of vertical thrust rotors consists of two stacked vertical thrust rotors.

In some embodiments the stacked plurality of vertical thrust rotors are driven by the same propulsion unit. Thus it may be for instance that the stacked plurality of vertical thrust rotors are powered by a single electric motor. This may reduce weight and/or complexity and may be facilitated at least in part by the provision of the stacked plurality of vertical thrust rotors to one side of the second rotor assembly pylon, rather for instance than being separated thereby.

In some embodiments the stacked plurality of vertical thrust rotors are supported in propulsive rotation by a common set of bearings and/or a common bearing race between the stacked plurality of vertical thrust rotors and the remainder of the second rotor assembly. Nonetheless, in other embodiments, independent bearing sets and/or bearing races may be used.

In some embodiments the stacked plurality of vertical thrust rotors share one or more other common components (e.g. a common thrust bearing and/or common rotor orientation locking mechanism for a stowed configuration (see further below)).

In some embodiments each of the stacked plurality of vertical thrust rotors consists of two blades. This may simplify stowing in a more drag efficient manner.

In some embodiments the flying vehicle comprises a second rotor assembly control system arranged to control selective deployment to a deployed configuration and stowing to a stowed configuration of the second rotor assembly, where the deployment causes relative rotation of the stacked plurality of vertical thrust rotors about their respective thrust generating rotation axes to the deployed configuration wherein rotor blades of each of the stacked plurality of vertical thrust rotors are angularly misaligned with those of the others and where the stowing causes relative rotation of the stacked plurality of vertical thrust rotors about their respective thrust generating rotation axes to the stowed configuration wherein the rotor blades of each of the stacked plurality of vertical thrust rotors are angularly aligned with those of the others. This may allow a combination of increased vertical thrust produced when deployed and, especially where there are only two blades per rotor of the stacked rotor, drag reduction in the stowed configuration when the stacked rotors are not in use for thrust generation.

In some embodiments, in the deployed configuration, the combination of rotor blades across all of the stacked plurality of vertical thrust rotors are arranged such that successive progression of rotor blades in an angular direction are spaced at equal intervals. Alternatively however, successive progression of rotor blades in an angular direction may not (at least all) be spaced at equal intervals. It may be for instance that in combination, the rotor blades form a cross-shape, with a first set of opposite segments between blades being equal in angular extent but different in angular extent from a second set of opposite segments. Such an arrangement may improve efficiency and noise performance.

In some embodiments the stacked plurality of vertical thrust rotors are in the deployed configuration when driven to produce thrust.

In some embodiments, in the stowed configuration, the rotor blades of each of the stacked plurality of vertical thrust rotors are substantially aligned with an axis that is parallel to a longitudinal axis of the flying vehicle. This may mean that the rotor blades of the stacked rotors present a relatively small total frontal area which may reduce drag when the stacked rotors are in the stowed configuration. The total frontal area may be still further reduced in this way, even by comparison with two similarly aligned rotors which are significantly separated. Specifically, where the rotors are aligned as described, are in close proximity and there is twist in the blades, there may be at least partial aerodynamic shrouding of one blade adjacent to another in a separate of the stacked rotors, thereby further reducing total frontal area.

In some embodiments the stacked plurality of vertical thrust rotors are in the stowed configuration when not driven to produce thrust. It may be for instance that the flying vehicle generates sufficient lift in conventional flight without contribution from the stacked rotors being necessary and so the second rotor assembly may be stowed to reduce power consumption and drag. The second rotor assembly may then be deployed and powered to produce vertical thrust when a different flight configuration is entered (e.g. transition or vertical flight).

In some embodiments the tilt-rotor of the first rotor assembly is arranged to transition by tilting through substantially 90° for alternate delivery of substantially vertical flight thrust and substantially conventional flight thrust. Tilting capability beyond a 90° range may also be provided (e.g. in order to facilitate enhanced deceleration and/or a reverse flight mode and/or to facilitate flying vehicle yaw where one tilt-rotor tilts aft and another tilt-rotor on the other side of the aircraft tilts forwards).

In some embodiments the tilt-rotor of the first rotor assembly is arranged to translate in one of a forward or rearward direction with respect to the flying vehicle for a vertical thrust configuration thereof and to reverse the translation for a conventional flight configuration thereof. Thus for example, in addition to tilting upwards for the vertical flight configuration, the tilt-rotor may translate rearwards and this may occur whist the tilting upwards is occurring. It may be that rearwards translation is utilised for the vertical thrust configuration when the first rotor assembly is located further forward on the airframe of the flying vehicle than the second rotor assembly. Further it may be that forward translation is utilised for the vertical thrust configuration when the second rotor assembly is located further forward on the airframe of the flying vehicle than the first rotor assembly. This facility may be used to reduce the lever arm of the first rotor assembly in the conventional flight configuration and this may serve to reduce propeller fin effect.

In some embodiments at least one of the first and second rotor assemblies is mounted to a wing of the flying vehicle. The wing may be substantially centrally located in the longitudinal direction with respect to a fuselage of the flying vehicle. The wing may for instance be located proximate to the centre of gravity of the flying vehicle. Wings allow improved conventional flight efficiency. The wing may be a convenient mounting location for the first and/or second rotor assemblies in terms of various factors including efficiency, flying vehicle weight distribution, ground clearance etc. Where both the first and second rotor assemblies are mounted to the wing, this may tend to suggest relative proximity of the first and second rotor assemblies and potentially therefore greater significance of the invention in mitigating wake effects on whichever of the first and second rotor assemblies is downstream of the other.

In some embodiments the first rotor assembly or the second rotor assembly is wing mounted to project substantially forward of a leading edge of the wing.

In some embodiments the first rotor assembly or the second rotor assembly is wing mounted to project substantially rearwards of a trailing edge of the wing.

In some embodiments the stacked plurality of vertical thrust rotors are mounted so as to be on substantially the same side of a horizontal plane that is aligned with a chord line of the wing.

In some embodiments the stacked plurality of vertical thrust rotors are mounted so as to be substantially above the horizontal plane that is aligned with the chord line of the wing. This may reduce the extent to which the stacked rotors experience the wake of the tilt-rotor in at least some flight configurations.

In some embodiments the first rotor assembly and the second rotor assembly constitute a pair of rotor assemblies and the flying vehicle comprises multiples instances of the pair of rotor assemblies in accordance with any of the embodiments discussed above in isolation or in any combination except where the combination would be mutually exclusive. It may in particular be that multiple instances of the pairs of rotor assemblies are provided on the wing of the flying vehicle and/or distributed across wings of the flying vehicle. In particular, it may be for instance that four instances of the pairs of rotor assemblies are provided, two on each wing of the flying vehicle. It may further be that all instances of the pair of rotor assemblies present are provided on the wings of the flying vehicle.

In some embodiments at least two of the instances of the pairs of rotor assemblies are mounted so as to be laterally misaligned. This may reduce the likelihood of a blade release trajectory from either instance of the pairs of rotor assemblies intersecting the blades of the other instance of the pairs of rotor assemblies in a blade-off event.

In some embodiments all rotor assemblies of the flying vehicle are provided as part of one of the pairs of rotor assemblies.

In some embodiments all rotor assemblies of the flying vehicle are provided on the wings of the flying vehicle.

In some embodiments all instances of the pairs of rotor assemblies have the first rotor assembly located further forward on an airframe of the flying vehicle than the second rotor assembly. There may in particular be two or four of such pairs of rotor assemblies.

In some embodiments all instances of the pairs of rotor assemblies have the second rotor assembly located further forward on an airframe of the flying vehicle than the first rotor assembly. There may in particular be two or four of such pairs of rotor assemblies.

In some embodiments the instances of the pairs of rotor assemblies may comprise a mix of one or more pairs in which the first rotor assembly is located further forward on an airframe of the flying vehicle than the second rotor assembly and one or more pairs in which the second rotor assembly is located further forward on the airframe of the flying vehicle than the first rotor assembly. There may further be an equal number of each type within the mix. Further, the different types may be arranged symmetrically about the longitudinal axis of the flying vehicle. This may help to mitigate propeller fin effect (which may tend to be exacerbated without there being a mix) whilst maintaining other benefits of the invention.

In some embodiments the flying vehicle comprises one or more instances of the pairs of rotor assemblies in combination with additional rotor assemblies. The additional rotor assemblies may comprise an additional one or more tilt-rotors and/or an additional one or more stacked plurality of vertical thrust rotors. It may be for instance that there are two instances of the pairs of rotors, one mounted at an inboard station on each wing and four additional rotor assemblies each comprising a plurality of stacked vertical thrust rotors, two mounted at an outboard station on each wing, one at each outboard station mounted to project substantially forward of a leading edge of the wing and the other at each outboard station mounted to project substantially rearward from a trailing edge of the wing.

In some embodiments the flying vehicle is an aircraft. The flying vehicle may be an aerial taxi. The flying vehicle may be a VTOL or short take-off and vertical landing (STOVL) flying vehicle. The flying vehicle may comprise a cockpit and/or a cabin. The flying vehicle may be occupied. The flying vehicle may be manned. The flying vehicle may be piloted and/or pilot occupied.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
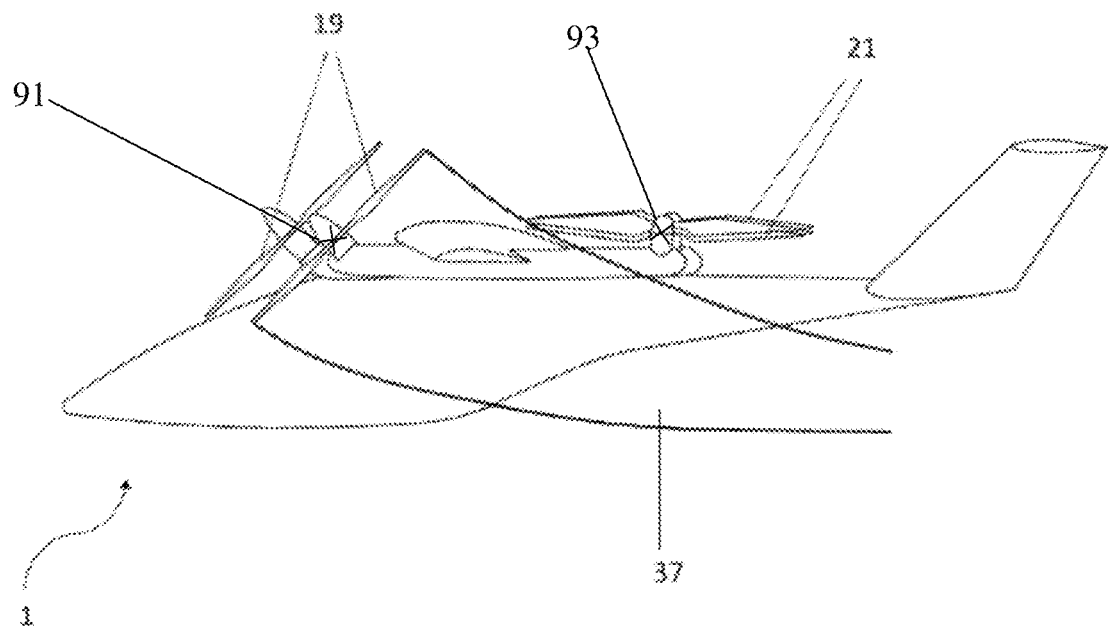
FIG. 1 shows a side view of an aircraft according to an embodiment of the invention.
Figure 2:
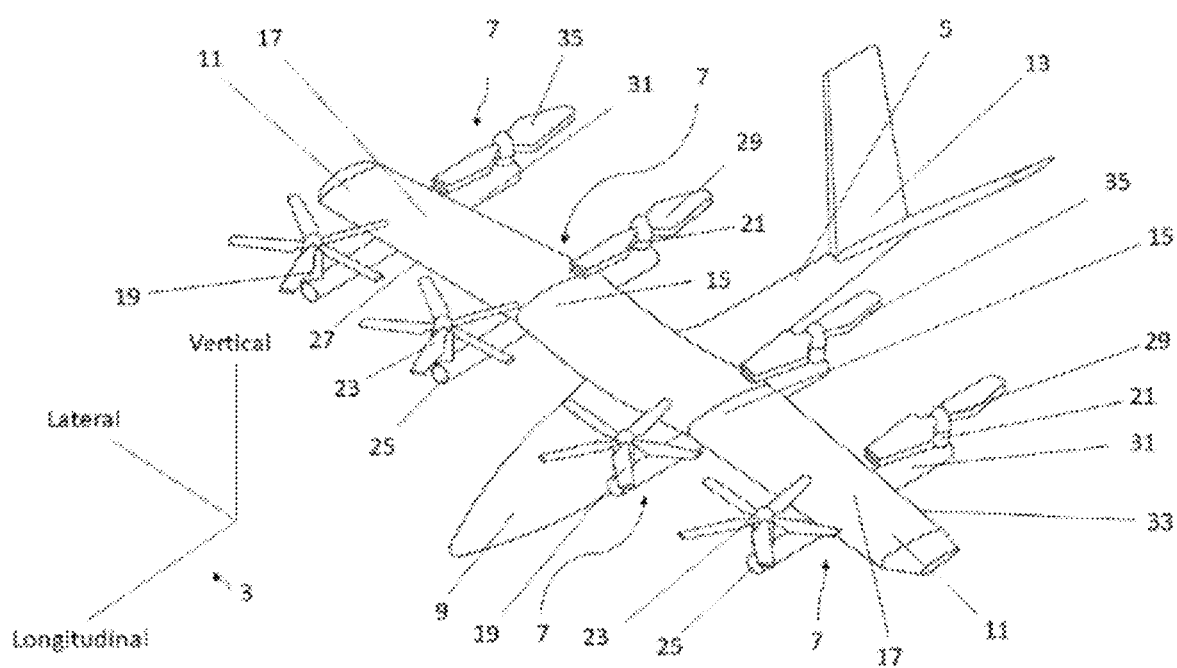
FIG. 2 shows a perspective view of an aircraft according to an embodiment of the invention.

With reference first to FIGS. 1 and 2, a flying vehicle, in this case a VTOL aerial taxi aircraft, is generally shown at 1. The aircraft 1 has longitudinal, lateral and vertical axes (see axes 3). The aircraft 1 has an airframe 5 and four pairs of rotor assemblies generally shown at 7 and mounted to the airframe 5. The airframe 5 has a fuselage 9, a pair of wings 11 and tail assembly 13. A centreline of the aircraft and the chord of the wings 11 follow the longitudinal axis. The spanwise direction of the wings 11 substantially follows the lateral axis. The fuselage 9 comprises a passenger cabin (not shown) and a cockpit (not shown). In other embodiments however, the passenger cabin may be omitted or replaced (for instance with a storage area) and especially where the aircraft 1 is arranged for autonomous control or control from a third party location, the cockpit may be omitted.

The wings 11 of the aircraft 1 are high mounted on the fuselage 9 (i.e. extending from the top of the fuselage 9) and extend from a longitudinal position substantially consistent with the centre of gravity of the aircraft 1. The four pairs of rotor assemblies 7 are mounted to the airframe 5 via the wings 11, with two per wing 11, one on each wing 11 mounted at an inboard station 15, at a position at approximately one third of the relevant wing's span, and one on each wing 11 mounted at an outboard station 17, at a position at approximately two thirds of the relevant wing's span.

Each pair of rotor assemblies 7 comprises a first rotor assembly 19 and a second rotor assembly 21. In each instance, the first rotor assembly 19 is located further forward on the airframe 5 of the aircraft 1 than the second rotor assembly 21. Further, in each instance, the first rotor assembly 19 is spaced from the second rotor assembly 21 in the longitudinal direction of the aircraft 1. The first 19 and second 21 rotor assemblies are substantially on a vertical plane that is parallel to a vertical plane aligned with the longitudinal axis of the aircraft 1 and in this case are both substantially on an axis that is parallel to the longitudinal axis of the aircraft 1.

The following description describes a single example of the first rotor assembly 19 and surrounding structure, though as will be appreciated, this description applies equally to all of the first rotor assemblies 19 of each of the pairs of rotor assemblies 7.

The first rotor assembly 19 comprises a tilt-rotor 23 arranged under the influence of a first rotor assembly control system to transition by tilting through substantially 90° for alternate delivery of substantially vertical flight thrust and substantially conventional flight thrust, with a transition zone between the two. The tilt-rotor 23 is mounted to the wing 11 at the relevant station 15, 17 by a first rotor assembly pylon 25. The first rotor assembly pylon 25 projects forward of a leading edge 27 of the wing 11, substantially normal to the leading edge 27. The tilt-rotor 23 is mounted proximate to the distal end of the first rotor assembly pylon 25. The tilt-rotor 23 itself therefore also projects substantially forward of the leading edge 27 and is arranged in a puller configuration. A tilt mechanism of the tilt-rotor 23 translates the tilt-rotor 23 as it tilts it. Specifically, as the tilt-rotor 23 is tilted towards a vertical thrust configuration, it is translated towards the wing 11 to which it is mounted (i.e. in this case rearward). Further as the tilt-rotor 23 is tilted towards a conventional flight configuration it is translated away from the wing 11 to which it is mounted (i.e. in this case rearward). The tilt rotor is powered by an electric motor (not shown). The tilt-rotor 23 comprises a centre 91.

The following description describes a single example of the second rotor assembly 21 and surrounding structure, though as will be appreciated, this description applies equally to all of the second rotor assemblies 21 of each of the pairs of rotor assemblies 7.

The second rotor assembly 21 comprises a stacked plurality of substantially vertical thrust rotors consisting in this case of two stacked rotors 29. The second rotor assembly 21 is mounted to the wing 11 at the relevant station 15, 17 by a second rotor assembly pylon 31. The second rotor assembly pylon 31 projects rearward of a trailing edge 33 of the wing 11, substantially normal to the trailing edge 33. The stacked rotors 29 are mounted proximate to the distal end of the second rotor assembly pylon 31 and themselves therefore also project substantially rearward of the trailing edge 33. The stacked rotors 29 are positioned on the same side of the second rotor assembly pylon 31 (in this case above it). In this embodiment, stacked rotors 29 are also mounted so as to be substantially above the horizontal plane that is aligned with the chord line of the wing 11 to which they are mounted. The stacked rotors 29 are oriented for vertical thrust generation and therefore each lies substantially in its own plane that is substantially parallel to the chord line of the wing 11 to which they are mounted. The stacked rotors 29 comprise a centre point 93.

The stacked rotors are provided for delivering substantially vertical thrust only and they are therefore not tilt-rotors. Nonetheless, in some embodiments the stacked rotors might have a limited degree of gimbling articulation e.g. to allow for modest stability corrections.

The stacked rotors 29 are of the same configuration and rotate about a common axis for thrust generation. The stacked rotors 29 are mounted in close proximity to one another (in this case the separation between the stacked rotors 29 is less than substantially 100% of a mean aerodynamic blade chord length of blades 35 of the stacked rotors 29). The second rotor assembly 21 also comprises a propulsion unit, in this case an electric motor (not shown) which drives both of the stacked rotors 29 in the same rotation direction for thrust generation.

Each of the stacked rotors 29 consists of two blades 35 extending in opposite directions and each having blade twist. In FIGS. 1 and 2, the second rotor assembly 21 is shown in a stowed configuration in which the blades 35 of each of the stacked rotors 29 are angularly aligned with those of the other, do not rotate and do not therefore provide vertical thrust. Additionally, the blades 35 are substantially aligned with an axis that is parallel to a longitudinal axis of the aircraft 1 and are retained there (e.g. with the use of a suitable stop, detent, clutch or similar). A second rotor assembly control system is however capable of controlling relative rotation between the two stacked rotors 29 rotors about their respective thrust generating rotation axes, to a deployed configuration. In the deployed configuration, the blades 35 of each of the stacked rotors 29 are angularly misaligned with those of the other, and in particular the relative rotation is through substantially 90°, such that in combination, the stacked rotors 29 give a four blade system with the blades 35 equally spaced in an angular direction. The second rotor assembly control system is also capable of returning the second rotor assembly 21 to the stacked configuration, via further suitable relative rotation between the stacked rotors 29. The second rotor assembly control system may comprise any suitable system to effect adjustment between the stowed and deployed configurations (e.g. it may utilise electrical power to release, secure and/or actuate relative rotation of the stacked rotors 29 and/or it may use conventional flight airflow to passively relatively rotate the stacked rotors and/or it may use stacked rotor blade inertia 29 and/or a braking force selectively applied to one/or the other stacked rotors 29 to effect relative rotation between the stacked rotors).

In use, the aircraft 1 is operable in conventional, transition and vertical flight and has different configurations for each of these flight modes.

During conventional flight, the required lift is provided by the wings 11, with propulsion being delivered by the tilt-rotors 23 (controlled by the first rotor assembly control system under instruction from a flight controller) to be configured in a conventional flight mode (that is, with the planes of the blades of the tilt-rotors 23 substantially vertically aligned). In this configuration, wash from the tilt-rotor 23 in each pair of rotor assemblies 7 impinges on the stacked rotors 29 of the second rotor assembly 21 in the same pair. Nonetheless, during conventional flight, the flight controller controls the second rotor assembly control system to place the second rotor assembly 21 in the stowed configuration. The consequent alignment of the blades 35 of the stacked rotors 29 with an axis that is parallel to a longitudinal axis of the aircraft 1, means that the stacked rotors 29 present a relatively small total frontal area to the airflow in conventional flight and wash from the tilt-rotors 23. Furthermore, due to the proximity of the stacked rotors 29 and the blade twist in the blades 35 thereof, one of the stacked rotors 29 is partially occluded by the other so as to reduce the total frontal area by comparison with a theoretical scenario in which the stacked rotors are aligned as described above but are significantly separated (e.g. by a pylon) supporting them. Consequently, drag and noise produced by the second rotor assembly 21 when not in use during conventional flight may be reduced.

The above arrangement is not intended to be limiting however and in other embodiments the stacked rotors 29 may be located substantially beyond the wash from the tilt-rotors 23 when the tilt-rotors 23 are in the conventional flight configuration. This may be facilitated by the close proximity of the stacked rotors 29 to one side of the second rotor assembly pylon 31.

When it is desired to enter vertical flight, the flight controller begins to adjust the configuration of the aircraft 1 from the conventional flight configuration to a vertical flight configuration. Between the conventional and vertical flight configurations the aircraft 1 is in a transition configuration and performs transition flight. Where transition occurs from conventional to vertical flight, the transition configuration and flight is characterised by a steady reduction in conventional (i.e. forward) flight thrust as the flight controller instructs the first rotor assembly control system to adjust the pitch of the tilt-rotors 21 to a vertical flight configuration (that is, with the planes of the blades of the tilt-rotors 23 substantially horizontally aligned). It is further characterised by a consequent reduction in lift provided by the wings 11 and an increase in vertical thrust provided by both the tilt-rotors 23 as they are tilted and the stacked rotors 29 as, under the control of the flight controller, the second rotor assembly control system moves the stacked rotors 29 to their deployed configurations and activates them to provide vertical thrust. As the tilt-rotors 23 are tilted towards their vertical flight configuration, they are translated in a rearward direction towards the wing 11 and first rotor assembly pylon 25 to which they are mounted. This reduces the lever arm for each of the tilt-rotors 23 and may reduce propeller fin effect forces experienced during the transition configuration.

During part of the transition, the stacked rotors 29 are running (providing vertical thrust) and yet each is impinged upon by a wake 37 of the respective upstream tilt-rotor 23, which has not yet tilted sufficiently for the wake 37 to be no longer so incident. Nonetheless, the time for which this remains the case may be reduced by comparison with alternative configurations, owing to the proximity of the stacked rotors 29 and their location above the second rotor assembly pylon 31.

In view of the proximity of the stacked rotors 29 to each other, when in the deployed configuration, they effectively form a single lifting aerofoil of (in this case) four blades. This may increase efficiency and reduce noise by comparison with circumstances where the stacked rotors are separated by a greater distance (e.g. as enforced by an intervening pylon).

Once the vertical flight mode is reached, the aircraft may be operated to hover or ascend or descend vertically (e.g. for vertical take-off or landing) via suitable adjustment to the thrust generated by the tilt-rotors 23 and stacked rotors 29.

Where it is again desired to enter conventional flight, the previously described transition process can be reversed. This includes extension (i.e. translation forwards) of the tilt-rotors 23, as they are tilted to their conventional flight configuration. It should further be noted that at least in some embodiments the transition configuration may be maintained as a stable configuration, e.g. with the tilt-rotors 23 maintained at a selected tilt-angle among possible tilt angles between their tilt angle in the conventional flight configuration and in the vertical flight configuration. Additionally the stacked rotors 29 may be stowed and deactivated or deployed and running to produce thrust in accordance with the vertical thrust required given parameters such as airspeed and the angle of the tilt-rotors 23.

Figure 3:
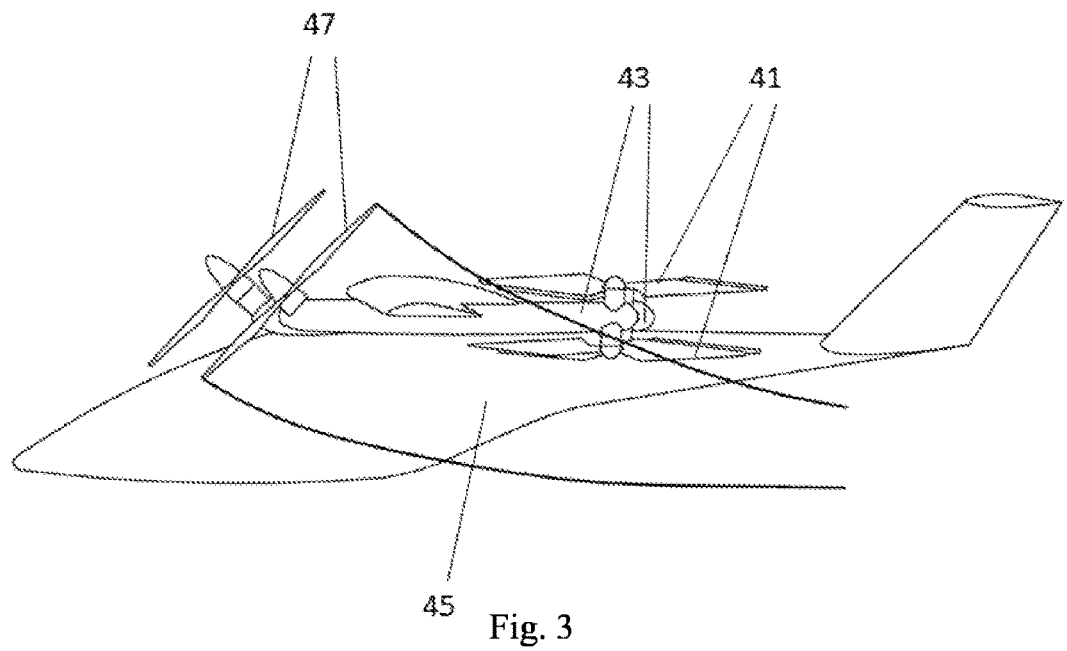
FIG. 3 shows an alternative to the present invention which would not benefit from the same advantages.

The embodiment of FIGS. 1 and 2 may have several advantages over an arrangement such as that shown in FIG. 3. The arrangement of FIG. 3 is substantially similar to that of FIGS. 1 and 2, but rather than the stacked rotors 29 being located above the second rotor assembly pylon 31, the FIG. 2 arrangement utilises two significantly further separated vertical rotors 41, one mounted either side of a pylon 43 which mounts them. This may mean that the vertical rotors 41 are exposed to a wake 45 of upstream tilt-rotors 47 for a greater part of a conventional and transition flight mode, potentially negatively impacting performance and noise. Further, any stowing of the vertical rotors 41 when not in use, cannot benefit from one rotor shrouding part of the other to further reduce the total frontal area, thus limiting the drag reduction that can be achieved. Furthermore, the separation between the vertical rotors 41 mean that they will not function collectively as a single multi-element lifting aerofoil, with the potential efficiency, dynamic and noise benefits that this would bring. Blade vortex interaction between the vertical rotors 41 may also be more likely. Furthermore, opportunities for component sharing (e.g. driving motor, bearings and/or bearing race) may be made more difficult by the FIG. 2 arrangement, potentially therefore adding weight and complexity.

Figure 4:
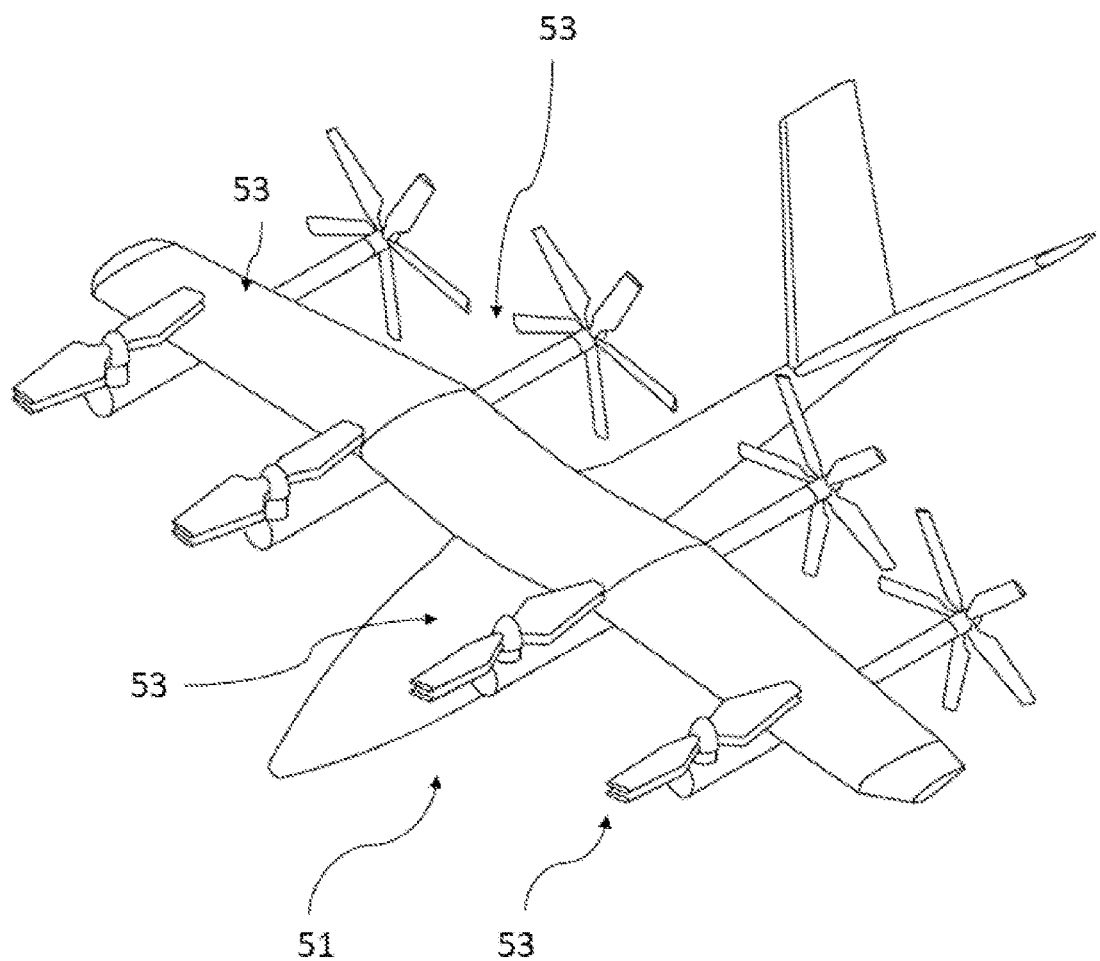
FIG. 4 shows a perspective view of an aircraft according to an embodiment of the invention.
Figure 5:
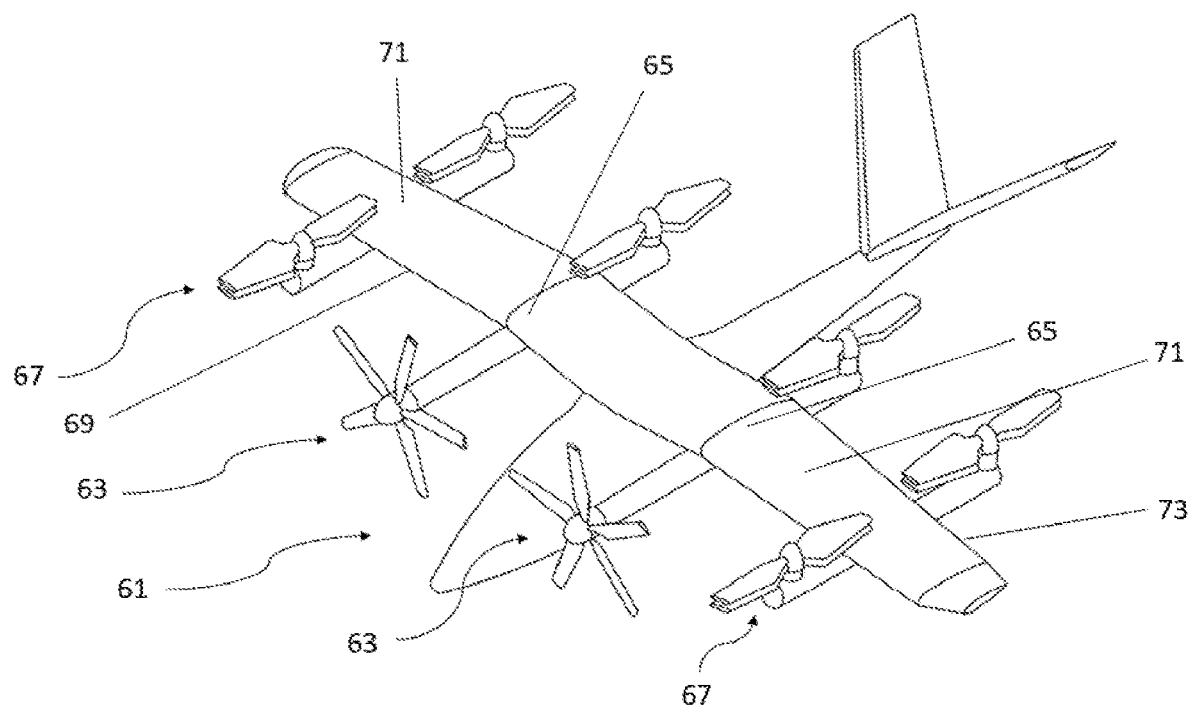
FIG. 5 shows a perspective view of an aircraft according to an embodiment of the invention.

Alternative embodiments of the invention are possible and FIGS. 4 and 5, show two examples of such alternative embodiments. The embodiment of FIG. 4 shows an aircraft 51 which is broadly similar to that discussed above with regard to FIGS. 1 and 2. The difference is that rather than the four pairs of rotor assemblies 7, the aircraft 51 has four pairs of rotor assemblies 53, which have reversed positions for first and second rotor assemblies by comparison with those of the four pairs of rotor assemblies 7. Thus, in FIG. 4, the second rotor assemblies (stacked rotors) are located forward of the first rotor assemblies (tilt-rotors). In this embodiment the first-rotor assemblies would be pushers and would tilt-downwards (rather than upwards) to provide vertical thrust.

The embodiment of FIG. 5 shows an aircraft 61 which is broadly similar to that discussed above with regard to FIGS. 1 and 2. The difference is that rather than the four pairs of rotor assemblies 7, the aircraft 61 has only two such pairs of rotor assemblies 63 at inboard stations 65. The outboard stations are occupied by pairs of rotor assemblies 67 having two examples of the second rotor assembly 21 (i.e. stacked rotors provided forward of a leading edge 69 of a wing 71 and rearward of a trailing edge 73 of the wing 71). The embodiment of FIG. 5 may be less susceptible to excessive propeller fin effect given that there are only two tilt-rotors and this may also lead to a reduction in weight. Nonetheless, the embodiment may still benefit from the advantages discussed with regard to the FIGS. 1 and 2 embodiment with respect to its pairs of rotor assemblies 67. The substituted second rotor assemblies 21 may provide additional vertical thrust for the vertical flight configuration as required.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A flying vehicle comprising a first rotor assembly, a second rotor assembly and a second rotor assembly pylon arranged to mount the second rotor assembly to a remainder of the flying vehicle, where the first rotor assembly and the second rotor assembly are located so that they are spaced in a longitudinal direction of the flying vehicle and so they are substantially on a vertical plane that is parallel to a vertical plane aligned with a longitudinal axis of the flying vehicle, where the first rotor assembly comprises a tilt-rotor arranged to tilt between delivery of substantially vertical flight thrust and substantially conventional flight thrust, and where further the second rotor assembly comprises a stacked plurality of substantially vertical thrust rotors mounted to the pylon so as to be substantially to a same side of the pylon, and where (i) the tilt rotor of the first rotor assembly is arranged to transition by tilting between a tilt angle range of substantially 90 degrees or beyond for alternate delivery of substantially vertical flight thrust and substantially conventional flight thrust, and (ii) a centre of the tilt rotor is located below a centre point of the stacked rotors when the flying vehicle is positioned substantially horizontal so that the first rotor assembly is arranged such that within the tilt angle range of the tilt-rotor there is no tilt angle in which an axis between a centre of the tilt-rotor and a centre point of the stacked rotors of the second rotor assembly is substantially normal to a plane of rotation defined by the blades of the tilt-rotor rotating for thrust delivery.

2. The flying vehicle according to claim 1 where the first rotor assembly and the second rotor assembly are located so that both are substantially on an axis that is parallel to a longitudinal axis of the flying vehicle.

3. The flying vehicle according to claim 1 where a separation between the vertical thrust rotors of the second rotor assembly is less than 100% of a mean aerodynamic blade chord length of blades of the vertical thrust rotors.

4. The flying vehicle according to claim 1 where the first rotor assembly is located further forward on an airframe of the flying vehicle than the second rotor assembly.

5. The flying vehicle according to claim 1 where the stacked vertical thrust rotors are mounted to the pylon so as to be substantially above the pylon.

6. The flying vehicle according to claim 1 where the second rotor assembly is arranged to provide thrust during at least a portion of a transition flight configuration of the flying vehicle during which the tilt-rotor of the first rotor assembly is tilting between delivery of substantially vertical flight thrust and substantially conventional flight thrust.

7. The flying vehicle according to claim 1 where the flying vehicle comprises a second rotor assembly control system arranged to control selective deployment to a deployed configuration and stowing to a stowed configuration of the second rotor assembly, where the deployment causes relative rotation between a first substantially vertical thrust rotor and a second substantially vertical thrust rotor of the stacked plurality of vertical thrust rotors about their respective thrust generating rotation axes to the deployed configuration wherein rotor blades of the first substantially vertical thrust rotor are angularly misaligned with rotor blades of the second substantially vertical thrust rotor and where the stowing causes relative rotation between the first substantially vertical thrust rotor and the second substantially vertical thrust rotor of the stacked plurality of vertical thrust rotors about their respective thrust generating rotation axes to the stowed configuration wherein the rotor blades of the first substantially vertical thrust rotor are angularly aligned with the rotor blades of the second substantially vertical thrust rotor.

8. The flying vehicle according to claim 7 where in the stowed configuration, the rotor blades of each of the stacked plurality of vertical thrust rotors are substantially aligned with an axis that is parallel to a longitudinal axis of the flying vehicle.

9. The flying vehicle according to claim 7 where the stacked plurality of vertical thrust rotors are in the stowed configuration when not driven to produce thrust.

10. The flying vehicle according to claim 1 where the tilt-rotor of the first rotor assembly is arranged to translate in one of a forward or rearward direction with respect to the flying vehicle for a vertical thrust configuration thereof and to reverse the translation for a conventional flight configuration thereof.

11. The flying vehicle according to claim 1 where at least one of the first and second rotor assemblies is mounted to a wing of the flying vehicle.

12. The flying vehicle according to claim 1 where one of the first and second rotor assemblies is wing mounted to project substantially forward of a leading edge of the wing.

13. The flying vehicle according to claim 1 where the first rotor assembly and the second rotor assembly constitute a pair of rotor assemblies and the flying vehicle comprises multiples instances of the pair of rotor assemblies.

14. The flying vehicle according to claim 13 where all rotor assemblies of the flying vehicle are provided as part of one of the pairs of rotor assemblies.

15. The flying vehicle according to claim 13 where all rotor assemblies of the flying vehicle are provided on the wings of the flying vehicle.

16. The flying vehicle according to claim 13 where all instances of the pairs of rotor assemblies have the first rotor assembly located further forward on an airframe of the flying vehicle than the second rotor assembly.

17. The flying vehicle according to claim 13 where the instances of the pairs of rotor assemblies comprise a mix of: one or more pairs in which the first rotor assembly is located further forward relative to an airframe of the flying vehicle than the second rotor assembly; and one or more pairs in which the second rotor assembly is located further forward relative to the airframe of the flying vehicle than the first rotor assembly.

18. The flying vehicle according to claim 1 which is a VTOL or STOVL aircraft.

* * * * *